(12) United States Patent
Kim

(10) Patent No.: US 6,679,136 B2
(45) Date of Patent: Jan. 20, 2004

(54) PARKING BRAKE SYSTEM

(75) Inventor: Jin-Gak Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/012,403

(22) Filed: Dec. 12, 2001

(65) Prior Publication Data
US 2002/0078780 A1 Jun. 27, 2002

(30) Foreign Application Priority Data
Dec. 21, 2000 (KR) .................................. 10-2000-79822

(51) Int. Cl.[7] .................................................. G05G 5/06
(52) U.S. Cl. .......................................... 74/527; 74/533
(58) Field of Search .......................... 74/527, 529, 533, 74/534, 535, 536, 537, 538, 586

(56) References Cited

U.S. PATENT DOCUMENTS

| 3,999,636 A | * | 12/1976 | Schumacher | 188/79.56 |
| 5,609,066 A | * | 3/1997 | Bunker et al. | 74/537 |
| 5,787,761 A | * | 8/1998 | Wang | 74/535 |

* cited by examiner

Primary Examiner—Thomas R. Hannon
Assistant Examiner—Vicky Johnson
(74) Attorney, Agent, or Firm—Antonelli, Terry, Stout & Kraus, LLP

(57) ABSTRACT

Disclosed herein is a parking brake system. The parking brake system includes a ratchet bracket having a ratchet and rotatably hinged to a brake plate, a first slot formed on the ratchet bracket, and a second slot formed on a cam provided on the lower portion of a parking lever. A parking lever control unit connects the first slot to the second slot and is adjustable in length thereof, with a junction of the parking lever control unit and the second slot rotatably hinged to the brake plate.

6 Claims, 5 Drawing Sheets

PARKING BRAKE SYSTEM

BACKGROUND OF THE INVENTION

1. Field of the Invention

The present invention relates generally to a parking brake system, and more particularly, to a parking brake system, which easily controls the stroke of a parking lever.

2. Description of the Prior Art

Referring to FIG. 1, a conventional parking brake system is designed to operate a brake device (not shown) mounted to the rear wheels (not shown) of a car, by operation of a cable 3 strained in a direction as shown by the arrow 4 of the drawing, when a parking lever 1 is pulled upward as shown by the arrow 2 of the drawing. Once the brake is applied, a ratchet unit 5 prevents unexpected release of the brake device, thus maintaining the car in a braked state.

The operation of the ratchet unit 5 is as follows. When the parking lever 1 is pulled in the direction as shown by the arrow 2 of FIG. 1, a brake pawl 7 moves in a direction as shown by the arrow 12 of the drawing toward a ratchet 11 integrated with a brake plate 9. Thereafter, the brake pawl 7 engages the ratchet 11 at a predetermined position, so an unexpected release of the brake device is prevented as far as there is no additional force applied to the brake device, thus maintaining the car in the braked state.

Such a conventional parking brake system is designed to reduce the stroke of the parking lever 1, by loosening a nut (not shown) of a cable adjusting part 13 and then retightening the nut while straining the cable 3, when the stroke of the parking lever 1 is undesirably excessive. In this case, the extendable range of the cable 3 is restricted within the length of the cable adjusting part 13. Therefore, the lining clearance of the rear wheels must be additionally adjusted to control the stroke of the parking lever 1, when full extension of the cable 3 within the length of the cable adjusting part 13 fails to sufficiently control the stroke of the parking lever 1. However, even when the lining clearance of the rear wheels is adjusted in this way, the stroke of the parking lever 1 may be still excessive. In such a case, there is no solution to cope with the undesirably excessive stroke of the parking lever 1. Therefore, the conventional parking brake system has a problem in that cars may roll when parked on sloped street, with an inevitable excessive stroke of the parking lever 1.

SUMMARY OF THE INVENTION

Accordingly, the present invention has been made keeping in mind the above problems occurring in the prior art, and provides a parking brake system, which reliably controls the stroke of a parking lever.

The present invention provides a parking brake system, comprising a ratchet bracket having a ratchet and rotatably hinged to a brake plate, a first slot formed on the ratchet bracket, a second slot formed on a cam provided on a lower portion of a parking lever, and a parking lever control unit connecting the first slot to the second slot and being adjustable in a length thereof, with the junction of the parking lever control unit and the second slot rotatably hinged to the brake plate.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
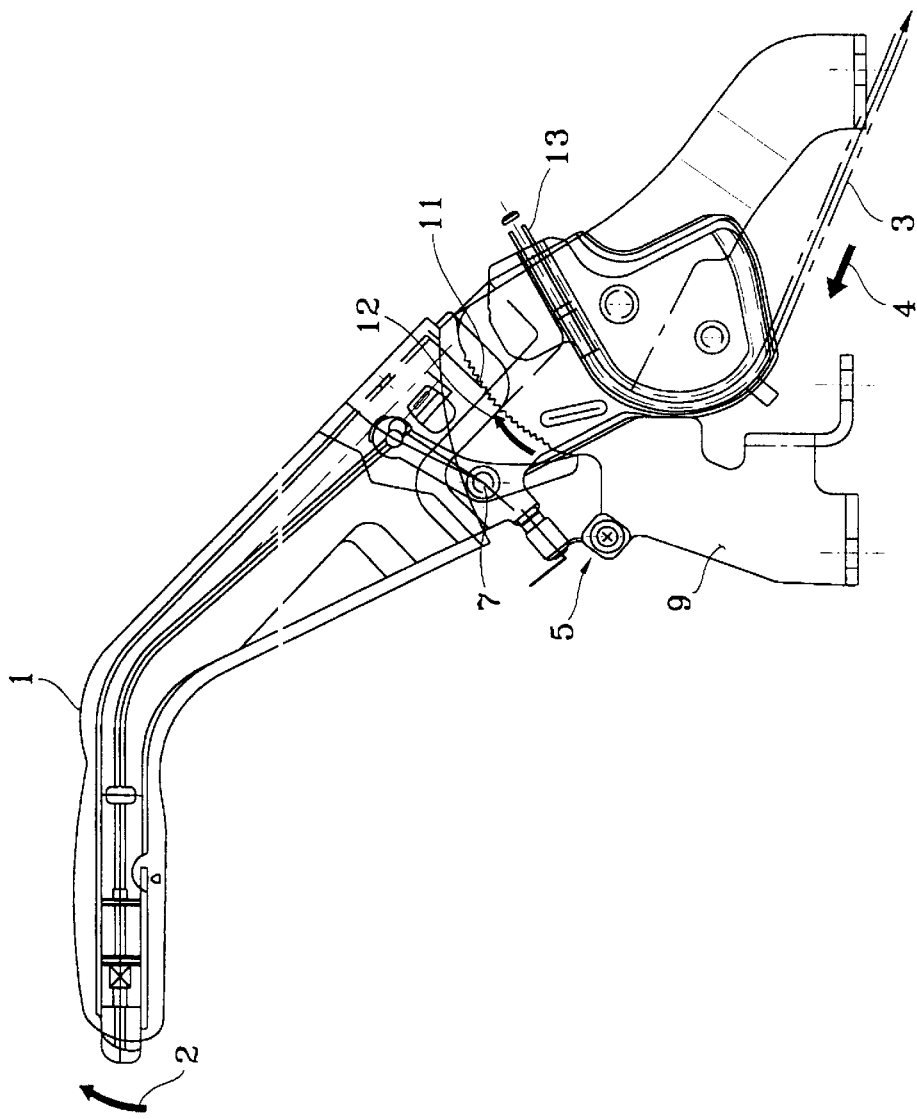
FIG. 1 is a schematic view showing a conventional parking brake system.

Reference now should be made to the drawings, in which the same reference numerals are used throughout the different drawings to designate the same or similar components.

Figure 2:
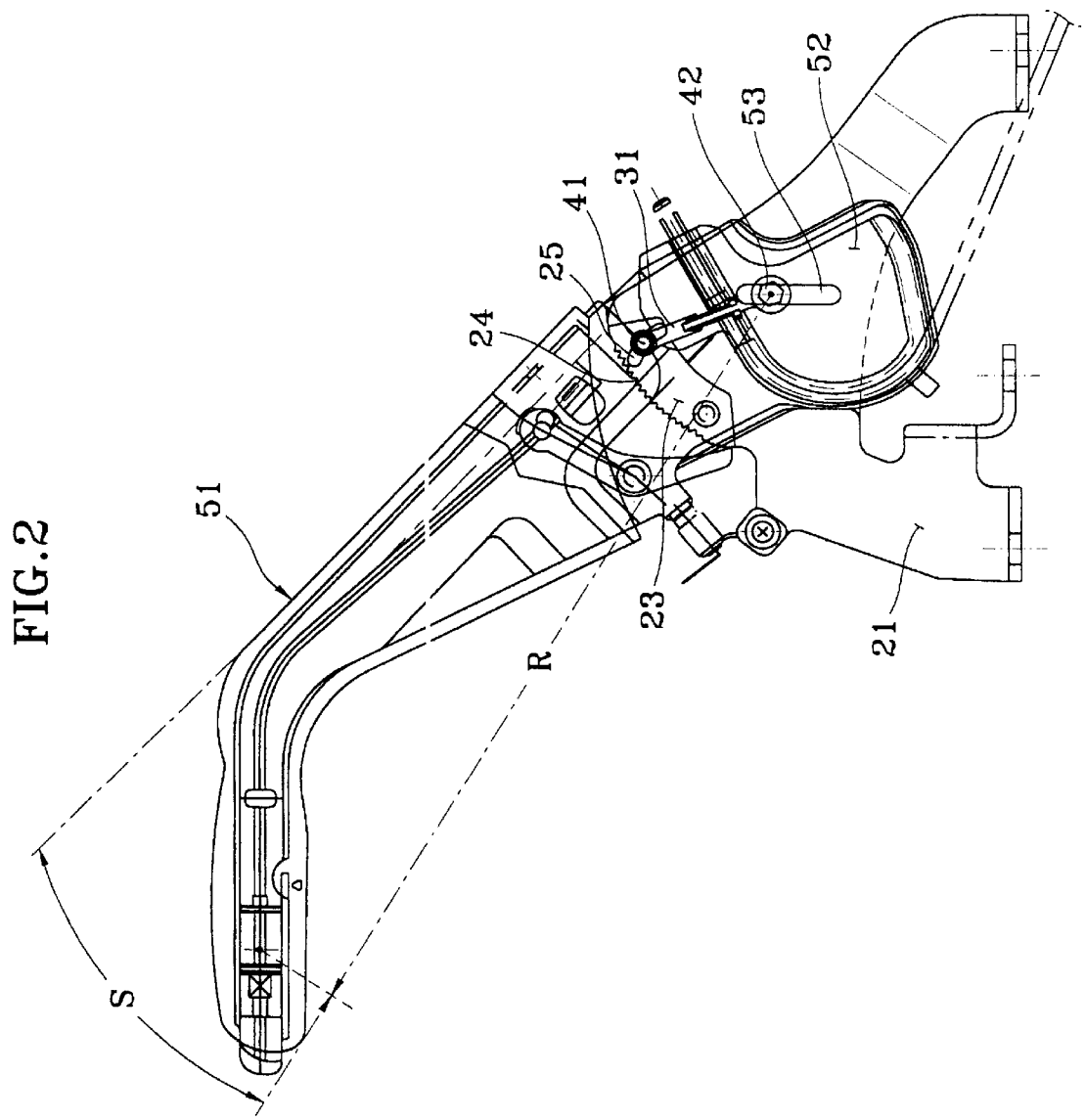
FIG. 2 is a schematic view showing a parking brake system according to the present invention, with a parking lever control unit mounted to the parking brake system.
Figure 3:
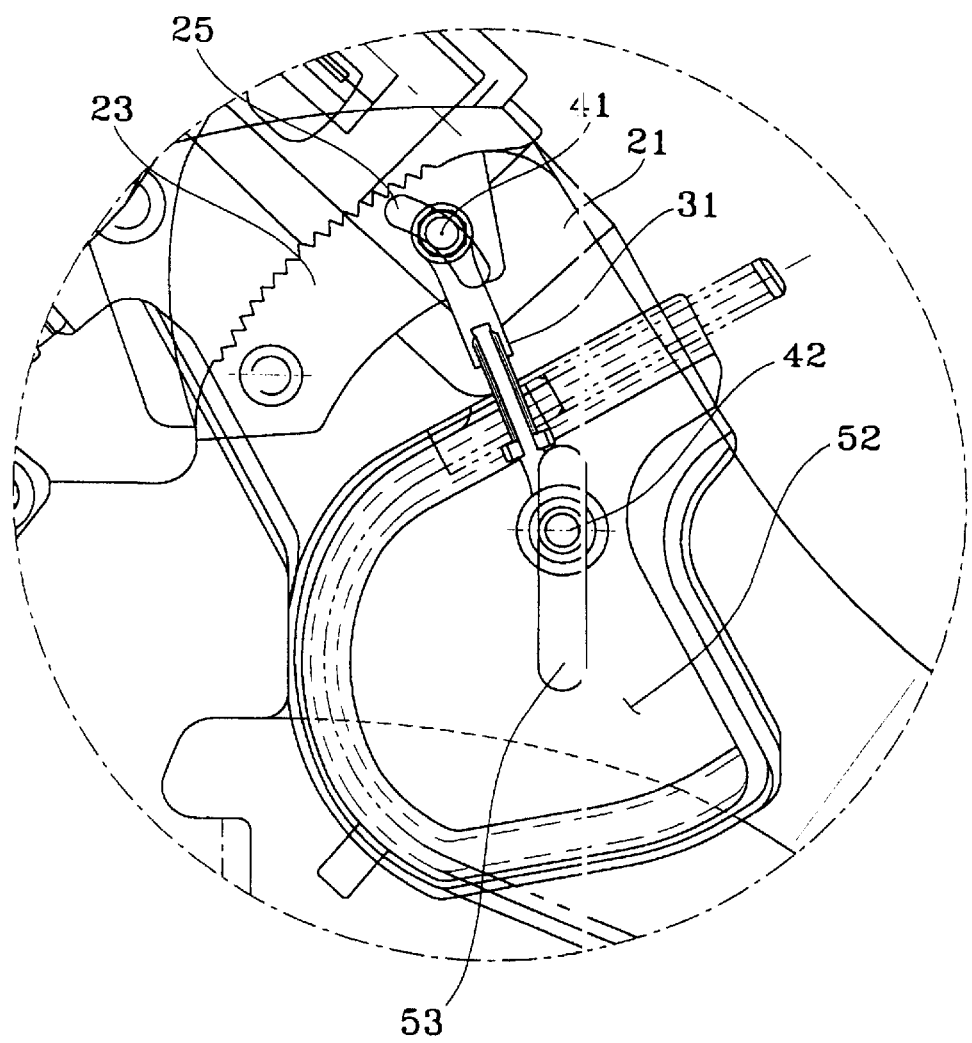
FIG. 3 is an enlarged detail view of the parking brake system of this invention.

Referring to FIGS. 2 and 3, the parking brake system of this invention includes a ratchet bracket 23, a first elongated slot 25, a second elongated slot 53 and a parking lever control unit 31. The ratchet bracket 23 provides on its one end with a ratchet 24 and is rotatabty hinged to a brake plate 21. The first slot 25 is formed on the ratchet bracket 23. The second slot 53 is formed on a cam 52 provided on the lower portion of a parking lever 51. A junction of the parking lever control unit 31 and the second slot 53 is rotatably hinged to the brake plate 21 for allowing the parking lever 51 to be rotated.

The parking lever control unit 31 connects the first slot 25 to the second slot 53 and is adjustable in length thereof. The junction of the parking lever control unit 31 and the second slot 53 is rotatably hinged to the brake plate 21. The upper portion of the parking lever control unit 31 is hinged to the ratchet bracket 23 by a bolt 41, whereas the lower portion of the parking lever control unit 31 is connected to the second slot 53 formed on the cam 52 of the parking lever 51. The junction of the parking lever control unit 31 and the second slot 53 is rotatably hinged to the brake plate 21 by means of a bolt 42.

Figure 4:
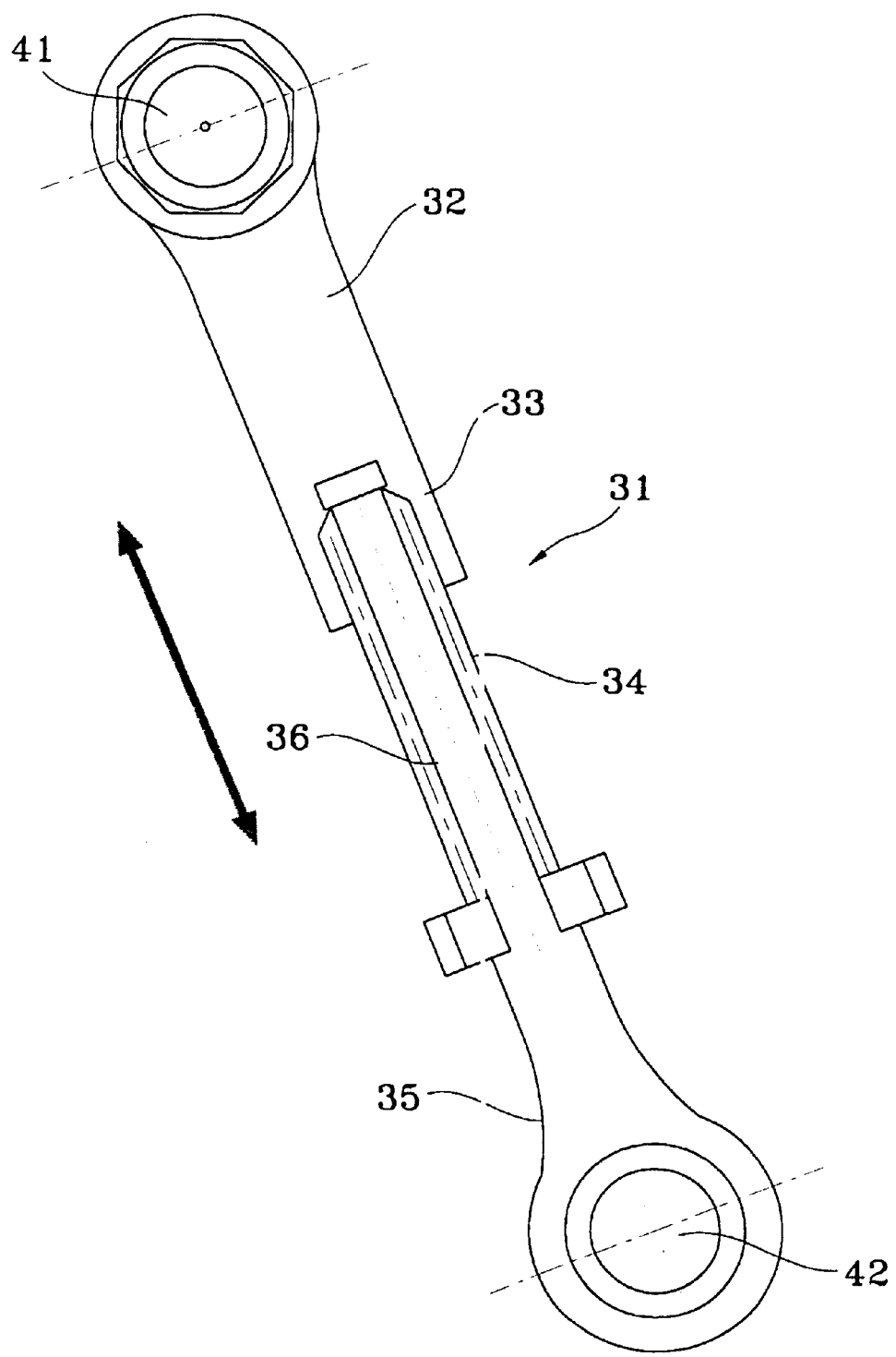
FIG. 4 is a side view of the parking lever control unit included in the parking brake system of this invention.

Referring to FIG. 4, the parking lever control unit 31 includes an upper rod 32, a hollow adjusting rod 34, and a lower rod 35. The upper rod 32 is provided on its lower portion with a nut part 33. The hollow adjusting rod 34 is provided with external threads so as to engage with the nut part 33 of the upper rod 32. The lower rod 35 has a small diameter part 36 axially inserted into the hollow adjusting rod 34.

In this parking lever control unit 31, the external threads of the hollow adjusting rod 34 engage with the nut part 33 of the upper rod 32. But the hollow adjusting rod 34 is freely rotatable about the small diameter part 36 of the lower rod 35. Thus, when rotating the hollow adjusting rod 34 about the small diameter part 36 of the lower rod 35, the hollow adjusting rod 34 having the external threads is tightened to or loosened from the nut part 33 of the upper rod 32, in accordance with a rotating direction of the hollow adjusting rod 34. In this way, the entire length of the parking lever control unit 31 is adjusted.

The method of controlling the stroke S of the parking lever 51 by means of the parking lever control unit 31 of this invention is as follows.

First, the parking brake system of this invention may control the stroke of the parking lever 51 by pulling a cable to adjust the nut of the cable adjusting part, in the same way as a conventional parking brake system.

The parking brake system of this invention may also control the stroke of the parking lever 51, differently from the above-mentioned first method. That is, a driver loosens the bolt 42 and upwardly moves the parking lever 51 through the second slot 53 formed on the cam 52. Thereafter, the bolt 42 is refastened at an adjusted position. Then the cable is strained to a desired degree. The stroke of the parking lever 51 is thus desirably controlled.

Figure 5:
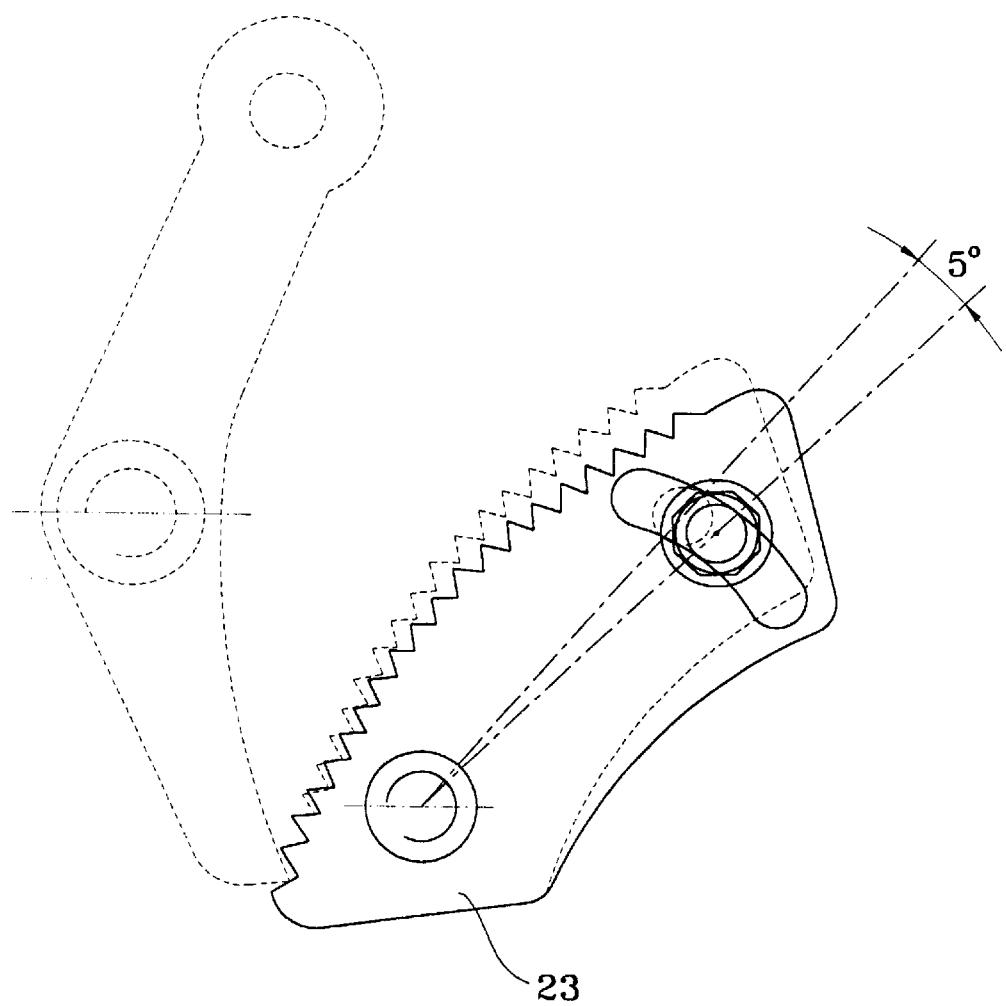
FIG. 5 is a schematic view showing an example of a ratchet bracket displaced from its original position by the parking lever control unit.

When loosening the bolt 42 and upwardly moving the parking lever 51, the ratchet bracket 23 connected to the parking lever control unit 31 is rotated with respect to the brake plate 21 as shown in FIG. 5, so the position of the ratchet 24 is changed. At this time, the ratchet 24 is returned to its original position by means of the hollow adjusting rod 34.

That is, when rotating the hollow adjusting rod 34, its external threads are loosened from the nut part 33 of the upper rod 32 or tightened to the nut part 33 thereof, thus being capable of adjusting the entire length of the parking lever control unit 31. When the parking lever 51 is upwardly moved with respect to the bolt 42 of the lower rod 35, the ratchet bracket 23 is also rotated and displaced from its original position. At this time, the ratchet bracket 23 is returned to the original position by rotating the hollow adjusting rod 34, thus easily accomplishing the function of the ratchet.

Thus, it is possible to operate the parking lever 51 in the case where the cable is more strained. Therefore, the parking brake system of this invention is capable of controlling the stroke of the parking lever 51 within a wider range, in comparison with a conventional parking system controlling the stroke of the parking lever by only pulling the cable and adjusting the cable adjusting part and the nut.

As described above, the present invention provides a parking brake system, which is capable of controlling the stroke of a parking lever within a wider range in comparison with conventional parking brake systems, thus greatly improving the safety of vehicles due to an improved control range. In is addition, the present invention provides a parking brake system, which easily controls the stroke of the parking lever when several vehicles parameters including weights are different from each other and the optimum parking conditions are changed, thus eliminating the need to manufacture different types of parking levers according to different models of vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A parking brake system, comprising:
    a ratchet bracket having a ratchet and rotatably hinged to a brake plate;
    a first slot formed on said ratchet bracket;
    a second slot formed on a cam provided on a lower portion of a parking lever; and
    a parking lever control unit connecting said first slot to said second slot and being adjustable in length thereof, with a junction of said parking lever control unit and said second slot rotatably hinged to the brake plate.

2. The parking brake system according to claim 1, wherein said parking lever control unit comprises:
    an upper rod provided on a lower portion thereof with a nut part;
    a hollow adjusting rod provided with external threads for being fastened to said nut part; and
    a lower rod having a small diameter part and axially inserted into the hollow adjusting rod.

3. A parking brake system, comprising:
    a ratchet bracket having a ratchet and rotatably hinged to a brake plate;
    a first elongated slot formed on said ratchet bracket;
    a second slot elongated formed on a cam provided on a lower portion of a parking lever; and
    a parking lever control unit connecting said first slot to said second slot and being adjustable in length thereof within at least one of the elongated slots and being attachable at different locations within the first and second slots, with a junction of said parking lever control unit and said second slot rotatably hinged to the brake plate.

4. The parking brake system according to claim 3, wherein said parking lever control unit comprises:
    an upper rod provided on a lower portion thereof with a nut part;
    a hollow adjusting rod provided with external threads for being fastened to said nut part; and
    a lower rod having a diameter part and axially inserted into the hollow adjusting rod.

5. A parking brake system according to claim 4, comprising:
    first and second fasteners disposed at ends of the parking lever control unit which respectively fasten the parking lever control unit to the different locations within the first and second slots.

6. A parking brake system according to claim 3, comprising:
    first and second fasteners disposed at ends of the parking lever control unit which respectively fasten the parking lever control unit to the different locations within the first and second slots.

* * * * *